United States Patent [19]
Leimbach et al.

[11] Patent Number: 5,984,072
[45] Date of Patent: Nov. 16, 1999

[54] ADJUSTING DEVICE FOR ACTIVATION OF A FRICTION CLUTCH

[75] Inventors: Lutz Leimbach; Andreas Ratte, both of Schweinfurt; Jens Dorfschmid, Schonungen; Ingo Franz, Mainberg; Thomas Wirth, Schwanfeld, all of Germany

[73] Assignee: Mannesman Sachs AG, Schweinfurt, Germany

[21] Appl. No.: 08/942,880

[22] Filed: Oct. 2, 1997

[30] Foreign Application Priority Data

Oct. 2, 1996 [DE] Germany ............................ 196 40 705
Jul. 12, 1997 [DE] Germany ............................ 197 29 997

[51] Int. Cl.$^6$ .............................. F16D 23/12; F16D 13/75
[52] U.S. Cl. ......................................................... 192/111 A
[58] Field of Search .............................. 192/111 A, 70.25

[56] References Cited

U.S. PATENT DOCUMENTS

| | | | |
|---|---|---|---|
| 2,002,841 | 5/1935 | Tatter | 192/111 A |
| 2,040,034 | 5/1936 | Tatter | 192/70.25 X |
| 2,061,093 | 11/1936 | Tatter | 192/111 A X |
| 2,421,869 | 6/1947 | Brock | 192/111 AXZ |
| 3,314,511 | 4/1967 | Randol | 192/111 A X |
| 4,270,646 | 6/1981 | Norcross . | |
| 4,304,332 | 12/1981 | Beccaris . | |
| 4,556,137 | 12/1985 | Abe | 192/111 A |
| 4,693,137 | 9/1987 | Deligny | 192/111 A X |
| 4,793,206 | 12/1988 | Suzuki | 192/111 A X |
| 5,265,710 | 11/1993 | Gabas et al. | 192/111 A |

FOREIGN PATENT DOCUMENTS

| | | | |
|---|---|---|---|
| 81 02729 | 2/1981 | France | F16D 13/75 |
| 25 00 454 | 1/1975 | Germany | F16D 13/75 |
| 27 57 487 | 6/1978 | Germany | F16D 13/75 |
| 37 06 849 A1 | 9/1988 | Germany . | |
| 35 04 708 | 6/1991 | Germany | F16D 13/75 |
| 295 11 623 U1 | 9/1995 | Germany . | |
| 56-48924 | 9/1979 | Japan . | |
| 58-156727 | 3/1982 | Japan . | |
| 63-61 | 6/1986 | Japan . | |
| 5-50157 | 12/1991 | Japan . | |
| 5-332343 | 5/1992 | Japan . | |
| 5-89970 | 5/1992 | Japan . | |
| 6-270707 | 3/1993 | Japan . | |
| 0 577 339 | 5/1946 | United Kingdom . | |
| 1 100 848 | 1/1968 | United Kingdom . | |
| 1 466 651 | 3/1977 | United Kingdom . | |
| 1 535 088 | 12/1978 | United Kingdom . | |
| 1 574 039 | 9/1980 | United Kingdom . | |
| 1 582 600 | 1/1981 | United Kingdom . | |
| 2 130 331 | 5/1984 | United Kingdom . | |

*Primary Examiner*—Rodney H. Bonck
*Attorney, Agent, or Firm*—Cohen, Pontani, Lieberman & Pavane

[57] ABSTRACT

An adjusting device for operating a friction clutch is brought into active connection with the friction clutch via an output device driven by a drive. The output device includes a compensation device that compensates for a wear-induced position change of the pressure spring of the friction clutch by permitting a length change of the output device. For this purpose, the compensation device includes a fixing device that secures the relative positions of the components of the output device to each other. The fixing device is releasable in a predetermined operating state of the adjusting device by a control element. When released, the fixing device allows the relative movement between the components of the output device required to implement the length change of the output device.

11 Claims, 6 Drawing Sheets

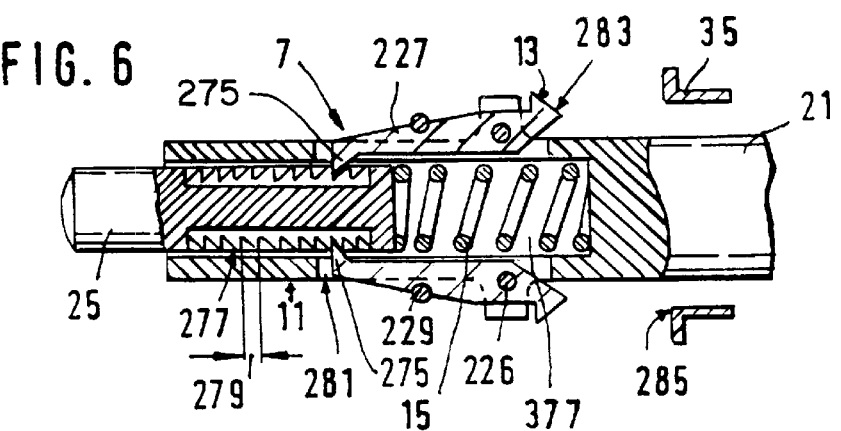

ADJUSTING DEVICE FOR ACTIVATION OF A FRICTION CLUTCH

BACKGROUND OF THE INVENTION

1. Field of the Invention

The present invention relates to an adjusting device for the activation of a friction clutch.

2. Description of the Related Art

A friction clutch with an adjusting device for automated operation is already known, for example, from DE 295 11 623 U1. This prior art reference discloses a system which comprises a friction clutch and an adjusting drive. This disclosed system further comprises a wear compensation device to keep the activation force of the friction clutch constant, as well as a compensation spring associated with the adjusting drive for the purpose of assisting the activation force of the friction clutch. Because of the wear compensation device, it is not necessary to take into account any tolerances, particularly any enlargement, when calculating the activation force that must be furnished by the drive to activate the clutch. As a result, a drive with lower power can be used. In addition, a transmission element in the adjusting device needs to be designed only for the lower forces initiated by the drive. These factors make it possible to embody an adjusting device compactly, so that little space is required.

A problem with the prior art is that the known adjusting device can be used only with friction clutches that have a wear compensation device.

SUMMARY OF THE INVENTION

The object of the invention is to further develop an adjusting device in such a way that the adjusting device can compensate for wear that occurs in friction clutches, without requiring additional structural space.

The adjusting device of the present invention can be used in friction clutches without a separate wear compensation device because the output device of the present invention includes a compensation device, which, for the purpose of compensating for a wear-induced change in position of the pressure spring of the friction clutch, makes it possible to change the length of the output device. To this end, the output device has components and an associated fixing device that secures the positions of the components relative to each other. The action of the fixing device can be neutralized by a control element in predetermined operational states, making possible the relative movement of the components required to change the length of the output device. The output device continually adjusts to a change in position of the pressure spring of the friction clutch. The output device of the present invention that compensates for the wear of the friction clutch can be used in a large number of known adjusting devices by simply exchanging or replacing a conventional transmission element with the output device of the present invention. The adjusting devices can thus be equipped with such a wear compensation device without any problem.

In certain operating situations, such as an engagement resulting from a rapid return movement of the output device, it is possible, if the fixing device has not yet been released, to elevate one component of the output device, namely the output-side component (hereinafter referred to as the output part). To ensure that an active connection is immediately re-established or to actively counteract this elevation, the output part has associated with it an energy storage device.

The force of the energy storage device acts upon the output part in the direction of the friction clutch. This ensures that, in the rest position, the output part of the output device is actively connected to the friction clutch and remains in a defined output position.

The output device further includes, in addition to the output part, a drive-side component (hereinafter referred to as the input part) and an intermediate part. The intermediate component is mounted via the input part and the intermediate component serves as the guide of the output part motion. In this design, no further guidance devices or bearing devices are needed to guide or bear the components of the output device. Therefore, the number of required components is minimized.

In a preferred embodiment, the control element of the fixing device includes clamping elements, which are arranged in recesses provided in the intermediate component and can be controlled by means of the input part. This arrangement makes a separate cage for the clamping elements unnecessary and thus minimizes the number of parts, which is advantageous during manufacturing.

The nesting within each other of the input part, intermediate component, and output part provides an especially compact design for the output device. In this case, it does not matter whether the output part or the input part is arranged radially outward or radially inward.

The control element of the fixing device is preferably in the form of a truncated cone. Thanks to this simple structure, the control element can be realized economically.

In another embodiment, rolling elements, especially rollers, are provided as clamping elements, whose clamping action can be controlled by means of wedge surfaces associated with the clamping elements. Because large forces must be transmitted via the output means for the purpose of clutch activation, the surfaces of the clamping bodies, as well as the surfaces with which the latter come into contact, must withstand this load. The use of larger contact regions, such as those of the rolling elements instead of balls, decreases the load per area so that, in given cases, special surface hardening is dispensed with and/or the useful life of the compensation device is increased.

The intermediate component or intermediate element includes a projection. Depending on the position of the output device, the projection of the intermediate component or intermediate element rests against a drive-side stop. In the disengaged state of the clutch, the fixing device is active, and a relative movement between the input part and the output part is prevented. Upon engagement of the clutch, the output device, and thus the intermediate element, are moved in the engagement direction until the projection of the intermediate component comes to rest on the drive-side stop. In this way, the intermediate element is prevented from moving farther. Upon continued movement of the input part, a relative movement occurs between the latter and the intermediate element. When the clamping elements are mounted by means of the intermediate element, a relative movement between the clamping elements and the input part is thus induced. In such an arrangement of the clamping elements, it has proved advantageous to connect the control element to the input part. The fixing device can be then be released in a position-dependent manner by means of the relative movement. The projection and the stop are to be arranged in such a way that, when the projection comes to rest on the stop, the clutch is already engaged, and the movement initiated on the drive side is continued at least slightly past this point. As a result, a relative movement occurs between the control element connected to the input part and the clamping elements. The reverse arrangement, in which the clamping elements are connected to the input part, is also conceivable. A relative movement of a control element that comes to rest on a drive-side stop is enough to implement release. The input part and the output part are coaxially nested, so that a force-locking or positive-locking connection can be established between them by means of a force acting in the radial direction or via elements arranged between them, such as clamping or latching elements.

In another embodiment, a fixing device comprises at least one lever element. This lever element is connected in articulated fashion to the input part. A rotational movement of this lever element around its rotational axis allows a force-locking or positive-locking connection of the input part and output part to be controlled by the lever element. The lever element can be brought into active connection with the control element, by the implementation of a positiondependent initiation of a rotary movement.

In a further embodiment, the lever element includes an end profile, which has associated with it a drive-side stop. The end profile comes into active connection with this stop. Upon continued movement of the drive-side component, a relative movement occurs between the lever element and the stop, this relative movement changes the resting point of the end profile on the stop. The change in resting point moves the lever element that is predetermined by the shape of the profile. It has proved advantageous to embody the end profile in a wedgeshaped manner, so that the change in resting point results in the desired rotational movement of the lever element.

In yet a further embodiment, the lever element includes a spring element, for establishing a preferred position of the lever element. If the lever element is equipped with an end profile, it is advantageous to pre-stress the lever element in the locking position. This ensures that the predetermined position is assumed or maintained even in the face of disruptive influences, such as vibrations of the vehicle. For releasing the fixing device, a force that counteracts the spring force of the spring element is provided by the control element.

The energy storage device is arranged in a recess located in the input part and/or the output part. First of all, this arrangement is space-saving. Secondly, the energy storage device is protected against negative influences, such as contamination, by the coaxial nesting of the input part and the output part.

A fixing device that has a clamping spring element has proved to be an advantageous embodiment. The clamping spring element establishes a connection from the input part to the output part by a radial force, whereby the input part, the output part and the clamping spring are nested coaxially within each other. This clamping spring element includes a control element in the form of a spreading element, which, in a position-dependent manner, absorbs the spring force of the clamping spring element, which causes the connection of the input part and the output to be released.

In yet another embodiment, a compensation device having a hydraulic chamber has the advantage that, when a viscous hydraulic medium is used, the vibrations transmitted to the hydraulic chamber by the vehicle have, due to the viscosity, virtually no influence on the compensation device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference numerals denote similar elements throughout the several views:

FIG. 6 shows another embodiment of the output device with lever elements for controlling a positive-locking connection;

FIG. 7 shows another embodiment of the output device with lever elements for controlling a force-locking connection;

FIG. 8a show another embodiment of the output device comprising a clamping spring element;

FIG. 8b shows the clamping spring element of FIG. 8a, viewed along line B—B of FIG. 8a;

DETAILED DESCRIPTION OF THE PRESENTLY PREFERRED EMBODIMENTS

Figure 1:
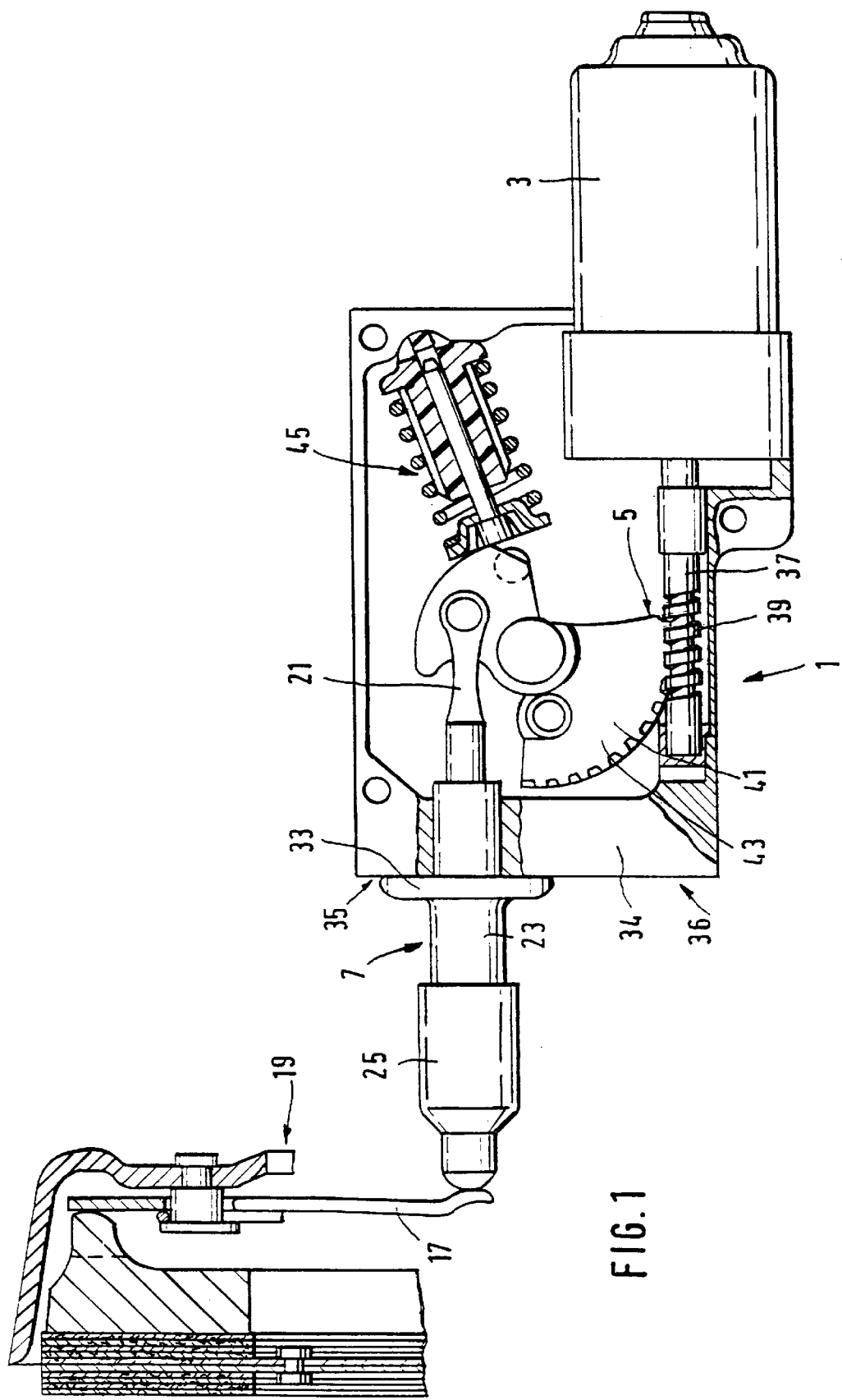
FIG. 1 is a schematic depiction of a friction clutch equipped with an embodiment of the adjusting device of the present invention.
Figure 2:
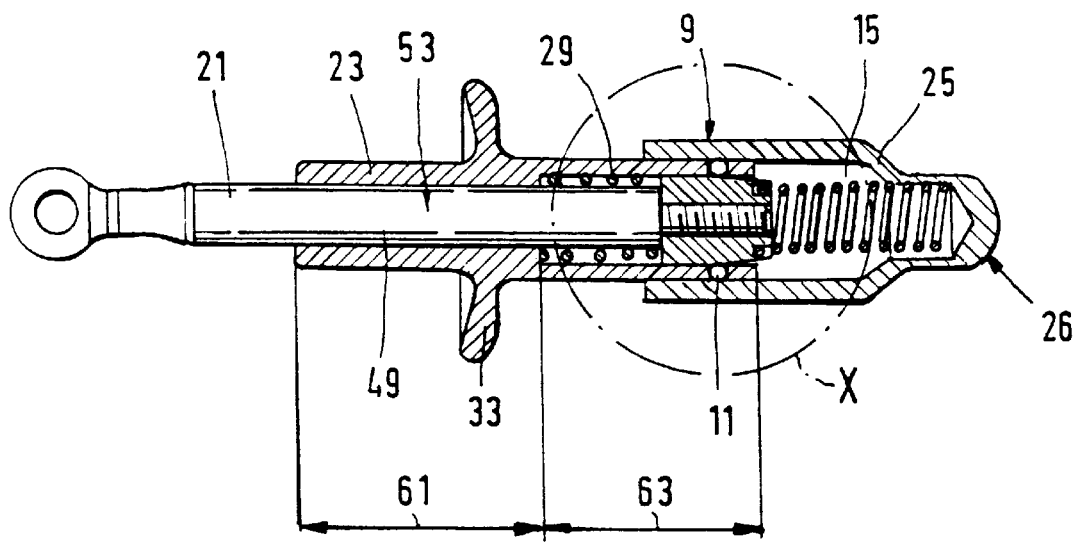
FIG. 2 shows a sectional view through an output device of the adjusting device shown in FIG. 1.
Figure 3:
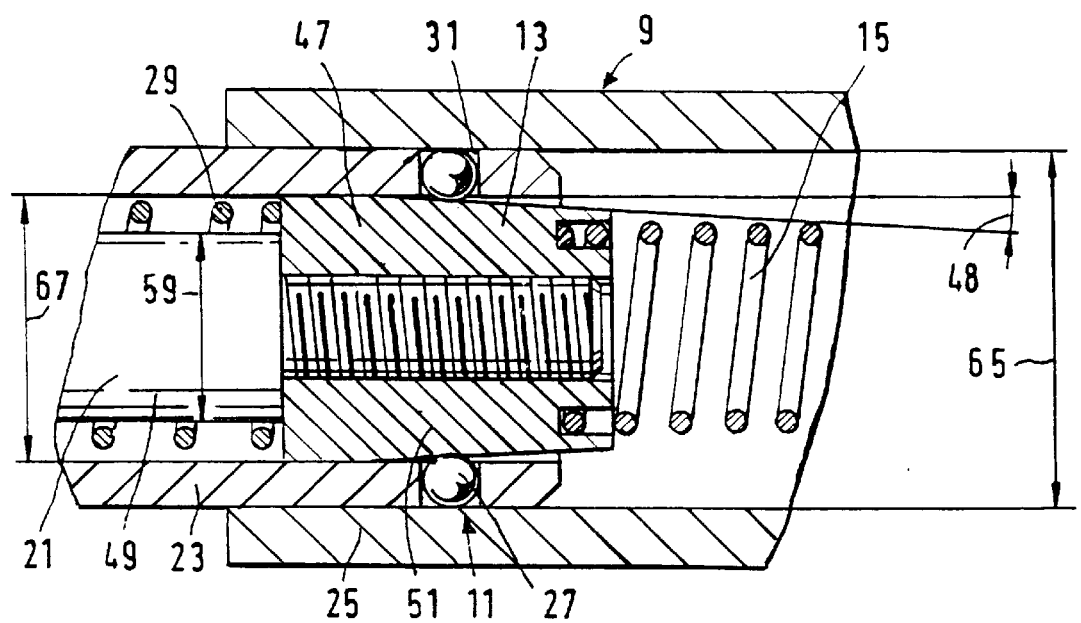
FIG. 3 is an enlarged detail of the region X of FIG. 2 showing a compensation device of the output device of FIG. 2.

Referring to FIGS. 1, 2, and 3, the basic structure of an adjusting device 1 for the operation of a friction clutch is described. The adjusting device 1 comprises a drive 3. An output part 37 of drive 3 includes a gear input part 39, which engages a segmental gear wheel 41 which is in the form of a transmission output part 43. An input part 21 of an output device 7 of the adjusting device 1 is connected in articulated fashion to the segmental gear wheel 41. In addition, the segmental gear wheel 41 includes a compensation spring 45 for assisting clutch activation, as described in greater detail in DE 37 06 849 OS. This compensation spring 45 is optional. A transmission 5 includes the output part 37 and the segmental gear wheel 41 for transferring the drive 3 motion to the input part.

The input part 21 is divided into an input part torso 49 and an input part head 51 (See FIGS. 2 and 3). The input part head 51 is arranged on the side of the input part torso 49 that faces away from the segmental gear wheel 41, in the form of a truncated cone 47. A diameter of the truncated cone 47 declines axially toward the outside at a fixed predetermined angle 48. The input part 21 is coaxially surrounded by an intermediate component 23 arranged between the input part 21 and an output part 25. The intermediate component 23 has an axial recess 53 of a varying diameter. The axial recess 53 has two regions, a drive side region 63 and a clutch side region 61. In the drive side region 61, the diameter of the axial recess 53 is slightly larger than the input part torso diameter 59. As a result, the input part torso 49 is movable under slight friction force within the drive side region 61 of the axial recess 53. The input part torso 49 penetrates the drive side region 61 of the intermediate component 23 and enters a clutch side region 63 of the intermediate component 23 of the axial recess 53, which has a larger diameter than the drive side region 61. The diameter of the clutch side region 63 of the axial recess 53 is slightly larger than the maximum diameter of the input part head 51, so that the input part head 51 is movable within the clutch side region 63 under slight friction force. On the side of the intermediate component 23 facing away from the segmental gear wheel 41, several recesses 31 are arranged in the circumferential direction in the clutch side region 63 for accommodating clamping elements 27.

A spring element 29 surrounding the input part torso 49 is arranged in the clutch side region 63. The spring element 29 is compressed between the input part head 51 and the drive side region 61 with the smaller diameter of the axial recess 53 of the intermediate component 23. The spring element 29 is pre-stressed such that the relative positions of the input part 21 and the intermediate component 23 are established in a predetermined manner.

The intermediate component 23 has radial outer projections 33. The outer projections 33 are arranged outside of a casing 36. The casing 36 at least partially surrounds the adjusting device 1, and totally surrounds the transmission 5 of the adjusting device 1.

These outer projections 33 correspond to stops 35, which are provided on a casing wall 34 of casing 36 in the embodiment shown in FIGS. 1, 2, and 3. On the output side, the intermediate component 23 is coaxially surrounded by the output part 25. The output part 25 is a hollow cylinder closed at the end on the side 26 facing the friction clutch 19. The side 26 is operatively connected with the friction clutch 19. An inner diameter 65 of the output part 25 and a maximum diameter 67 of the input part head 51 are adjusted to each other such that the input part 21 and the output part 25 are connected to each other in a force-locking manner by the clamping elements 27. The output device 7 includes a compensation device 9 which comprises the spring element 29, the input part head 51, the fixing device 11, and the energy storage device 15. The compensation device automatically adjusts the length of the output device 7 to a changed position of the friction clutch 19 due to wear of the friction lining of the friction clutch 19.

The function of the adjusting device 1 is described briefly as follows: When a control device (not shown in the Figures) recognizes the need for at least temporary interruption of the power flow through the friction clutch 19, for example, when the driver desires to shift gears, the drive 3 of the adjusting device 1 is activated by the control device. The drive 3 drives the input part 21 via the transmission 5 in a substantially linear fashion. As the input part 21 is driven by drive 3, the spring element 29 arranged between the input part 21 and the intermediate component 23 relaxes at least partially. The spring force of the spring element 29 continues to press the outer projections 33 of the intermediate component 23 against the stops 35. The spring force prevents a movement of the intermediate component 23 relative to the stops 35. The input part 21 is thus initially moved relative to the intermediate component 23.

When the input part head 51 enters the region of the intermediate component 23 equipped with the clamping elements 27, the input part head 51 acting as a control element 13 contacts the clamping elements 27. Because the input part head 51 is embodied as a truncated cone 47, the clamping elements 27 are pressed radially outward to a greater and greater extent as the penetration of the input part head 51 into this region increases. As a result, the clamping elements 27, in turn, enter into a force-locking connection with the output part 25 that surrounds them. Because of this force-locking connection, the input part 21 is fixedly connected to the output part 25 and relative movement is prevented between the input part 21 and the intermediate component 23. As the input part 21 continues to be moved by drive 3, the projections 33 of the intermediate component 23 move away from the casing wall 34 serving as the stop 35. The linear movement of the input part 21 is now transmitted directly to the intermediate component 23 and the output part 25. Thus the output part 25 carries out a linear movement. The side 26 that faces the friction clutch 19 of the output part 25 then enters, directly or via a lever, into active connection with the disengagement device of the friction clutch 19. The friction clutch 19 is now in an opened state.

If the power flow is then to be re-established by closing the friction clutch 19, the drive 3 of the adjusting device 1 is driven in the opposite direction. The input part 21 is again withdrawn. The output device 7 comprising the input part 21, the intermediate component 23 and the output part 25 is first moved back in its entirety. The pressure spring of the friction clutch 19 relaxes. When the projections 33 of the intermediate component 23 meet the stops 35, further movement of the intermediate element 23 in the direction of the drive 3 is prevented. At that point, the intermediate component 23 can no longer follow the linear movement of the input part 21, and a relative movement begins between the input part 21 and the intermediate component 23 against the force of the spring element 29. As input part 21 continues to be driven, the input part head 51 is withdrawn from the region of the intermediate component 23 that is equipped with the clamping elements 27. As a result, the force-locking connection formed by means of the clamping elements 27 is released. The output part 25 is pressed toward the friction clutch by an energy storage device 15 arranged between the intermediate component 23 and the output part 25. The above mechanism allows compensation even for manufacturing tolerances by the installation of an adjusting device with a pre-stressed output device 7 and by the corresponding relaxation of the output device 7. Thus, the individual adjustment of the system is thus no longer necessary.

In this example, the energy storage device 15 is a spring that rests against the input part head 51. However, the spring used as the energy storage device 15 can also rest against the intermediate component 23. In either case, the maximum relative movement possible between the components 21 to 25 and 23 to 25 must be taken into account, so that the energy storage device 15 is always pre-stressed. The force acting from the pressure spring of the friction clutch 19 counteracts this force.

Because these two forces are acting upon it, the output part 25 is set to an equilibrium position. By this continually resetting force equilibrium, the output part 25 of the adjusting device 1 automatically readjusts in keeping with the wear of the friction lining of the friction clutch 19. The engagement distance of the friction clutch 19 remains constant or almost constant. The output device 7 of the adjusting device 1 adjusts continually, by changing in length, to the changed output position of the friction clutch 19, particularly the changed position of the pressure spring of the friction clutch 19.

Figure 4:
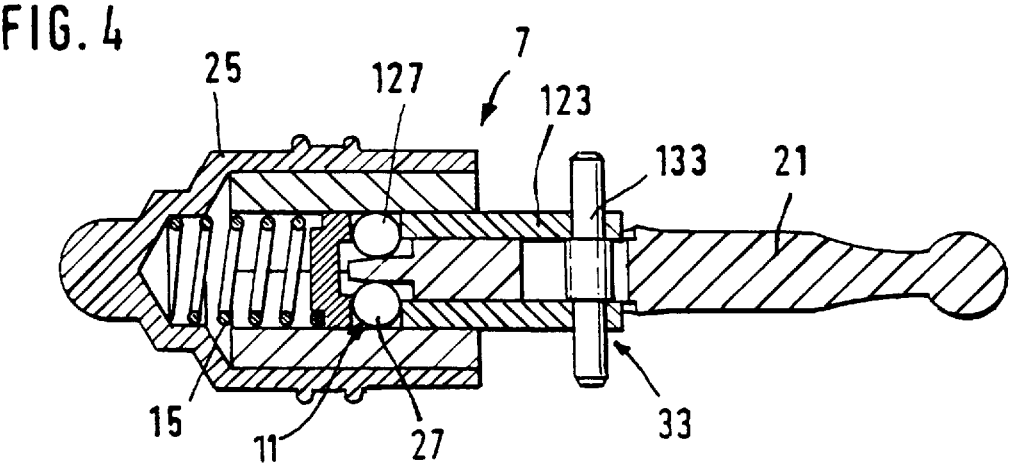
FIG. 4 is a sectional view through another embodiment of the output device of FIG. 1, with rolling bodies as the clamping element.
Figure 5:
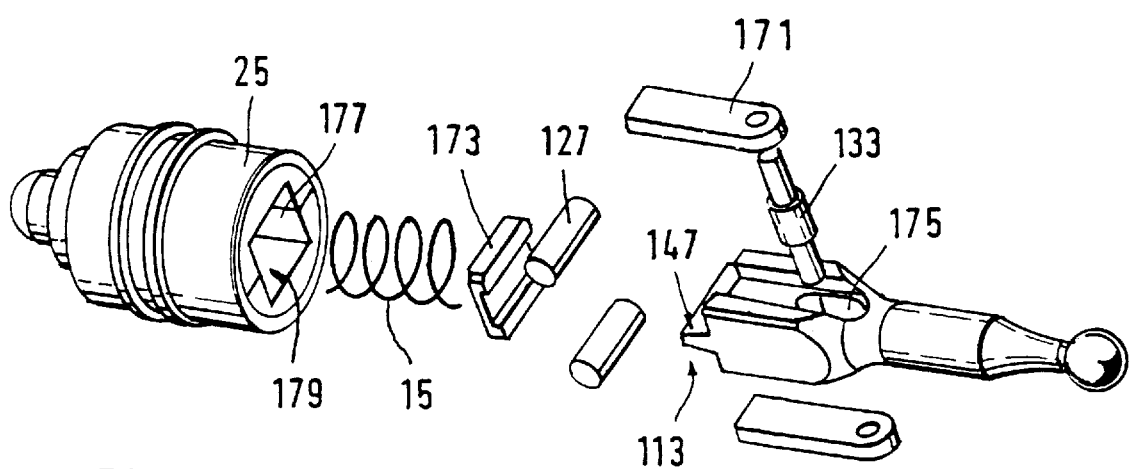
FIG. 5 is a spatial depiction of the output device shown in FIG. 4.

The embodiment of output device 7 shown in FIGS. 4 and 5 is similar to the example described in greater detail in reference to FIGS. 2 and 3. The essential difference is that, instead of the spherical clamping elements 27, the embodiment of FIGS. 4 and 5 includes rolling elements 127 as clamping elements. These rolling elements 127 come into active contact with wedge surfaces 147, which act as a control element 113 in keeping with the truncated cone 47 in FIG. 2. Instead of the intermediate component 23, the embodiment of FIGS. 4 and 5 includes a multi-part intermediate element 123. The rolling elements 127 are mounted by the interaction of side pieces 171 and an intermediate plate 173. The side pieces 171 are in turn connected by means of a shaft 133, whereby the projections 33 are also formed by the shaft 133. The shaft 133 is mounted in an elongated slot 175 embodied in the drive-side component. The output-side component 25 is embodied, for the purpose of accommodating the energy storage device 15, with a square inner profile 177. However, it is also possible to provide, depending on the number of rolling elements 127, a multi-edged profile that furnishes the counter-resting surfaces 179 for the rolling elements 127.

The function of the output device 7 of this embodiment corresponds to the function described earlier in reference to FIGS. 2 and 3. In this case, upon reaching the stop 35 (not shown in FIGS. 4 and 5), the rolling elements 127 are prevented from further movement in the drive direction by the intermediate element 123, thereby fixing output part 25 to input part 21. The fixing device 11 is released by relative movement between the input part 21 and the rolling elements 127.

The embodiment of output device 7 shown in FIG. 6 comprises lever elements 227, which are connected in articulated fashion to the input part 21 (hereafter referred to as drive-side component 21) of output device 7. Lever elements 227 pass through recesses 281 arranged in drive-side component 21. On the end facing the output part 25 (hereafter referred to as an output-side component 25) of output device 7, each of these lever elements 227 has a latching profile 275, which, when the fixing device 11 is active, engages into a mating profile 277 embodied in the output-side component 25. The precision of the mating profile 277 and the latching profile 275 establishes an interval value 279, at which minimal readjustment can be carried out. Arranged between the drive-side component 21 and the output-side component 25 is the energy storage device 15, which rests directly against the drive-side component 21 and output-side component 25. When the latching profile 275 engages the mating profile 277, a connection is established between the drive-side component 21 and the output-side component 25 because of a positive locking of the latching profile 275 into the mating profile 277. The end of the lever element 227 opposite to the latching profile 275 includes an end profile 283, which corresponds to the drive-side stop 35. Deviating from the depicted example, the output-side component 25 can be arranged coaxially relative to the drive-side component 21, so that the lever elements 227 rotate radially inward to release the fixing device 11, and the latching profile 275 is disengaged. The direction of the rotational movement can be simply established by the embodiment of the end profile 283 and suitable arrangement of the stops 35. The lever elements 227 are pre-stressed in the latching direction by a reset element 229.

The function of the output device 7 shown in FIG. 6 is described as follows: In the case depicted, the fixing device 11 is active. Relative movement between the drive-side component 21 and the output-side component 25 is prevented. The latching profile 275 is engaged with the mating profile 277. The shown position of the output device 7 corresponds to the disengaged state of the friction clutch (not shown in FIG. 6). When the drive-side component 21 moves, the end profile 283 comes into contact with the stops 35 at a resting point 285. Upon continued movement of the drive-side component 21, the resting point 285 on the end profile 283 migrates. As a result, the lever elements 227 move radially outward against the active force of the reset element 229. The fixing device 11 is released. The active spring force of the energy storage device 15 causes adjustment to be carried out due to the establishment of force equilibrium. When the drive-side component 21 is moved in the direction of the friction clutch, the latching profile 275 again engages with the mating profile 277. The fixing device 11 is therefore active again.

The embodiment of output device 7 shown in FIG. 7 has lever elements 227 connected in articulated fashion to the drive-side component 21. The drive-side component 21 with the lever elements 227 can also be embodied as a single piece in the form of a sleeve with an axial slot on the output side. In contrast to FIG. 6, the lever element 227 embodied here with the wedge surfaces 379. Associated with the lever element 227 is a control element 13 having an opposite-sense wedge surface 381. The control element 13 also has projections 333 which correspond to the projections 33 of the intermediate component 23 shown in FIGS. 2 and 3. Referring now back to FIG. 7, the control element 13 interacts with the drive-side stop 35. In the example shown, the control element 13 is arranged coaxially to the drive-side component 21 and the output-side component 25. The control element 13 has radially inward projections 375 that support a spring element 329, which continues to rest against the drive-side component 21. The spring element 329 braces the drive-side component 21 and the control element 13 relative to each other. The drive-side component 21, in turn, has a recess 377 for accommodating the output-side component 25. Arranged between, and supported by, the drive-side component 21 and the output-side component 25 is the energy storage device 15.

The function of the output device 7 shown in FIG. 7 is described as follows: When the fixing device is active, the wedge surfaces 379 of the lever elements 227 are in active contact with the opposite-sense wedge surfaces 381 of the control element 13 such that a force is transmitted in the radial direction via the lever elements 227 to the output-side component 25. The lever elements 221 are, in turn, connected to the drive-side component 21. As a result, the drive-side component 21 is connected to the output-side component 25 via the lever elements 227 in a force-locking manner when the fixing device 11 is active. When the projection 333 reaches the associated stop 35, a movement of the drive-side component 21, and thus a movement of the lever elements 227, relative to the control element 13 is initiated. This is accompanied by a reduction in the force produced by the engaged wedge surfaces 379. The force-locking connection between the drive-side component 21 and the output-side component 25 is at least loosened, and preferably completely eliminated. The action of the energy storage device 15 ensures adjustment due to the establishment of force equilibrium. The fixing device 11 is now inactive. To activate the fixing device 11, the drive-side component 21 is moved toward the friction clutch (not shown in FIG. 7). The projection 333 is retained in the stop position by the active spring force of the spring element 29 until the previously released force-locking connection of the control element 13 to the lever elements 227 and of the lever elements 227 to the output-side component 25 is re-established. The fixing device 11 is thus again active.

In the embodiment of the output device 7 shown in FIGS. 8a and 8b, the drive-side component 21 and the output-side component 25 are arranged coaxially. Arranged in a recess 415 embodied in the output-side component 25 is the energy storage device 15, which braces the drive-side component 21 against the output-side component 25. The drive-side component 21 overlaps the output-side component 25 axially in a region 429. In the example shown, the output-side component 25 is coaxial to the drive-side component 21. Also coaxial to the drive-side components 21 and the output-side component 25 is a clamping spring element 427. The clamping spring element 427 has a radially-directed pre-stress, which acts upon the output-side component 25. The clamping spring element 427 has flexible tongues 431 directed radially inward, which rest on the output-side component 25. The output-side component 25 in turn rests on the drive-side component 21. The drive-side component 21 is connected in a force-locking fashion to the output-side component 25 by the active spring force of the clamping spring element 427.

A different arrangement is also easily conceivable, in which, for example, the pre-stress force of the clamping spring element 427 acts radially outward, and the drive-side component 21 and the output-side component 25 are coaxial relative to the clamping spring element 427. It is also conceivable to provide a clamping spring element 427 between the drive-side component 21 and the output-side component 25 that is securely connected to one of the drive side component 21 and the output-side component 25 and can be brought into active force-locking connection with the other of the drive-side component 21 and the output-side component 25.

Referring again to FIGS. 8a and 8b, associated with this clamping spring element 427 is a stop 35. To release the active fixing device 11, the clamping spring element 427 interacts with the stop 35, which is embodied as an expanding element 435. The flexible tongues 431 are pressed radially outward by stop 35 as the output device is moved toward the stop 35. The pre-stress force is transmitted at least partially to the expanding element 435. If the flexible tongues 431 are pressed radially outward past the position assumed when the fixing device 11 is active, then the force-locking connection provided by the clamping spring element 427 between the drive-side component 21 and the output-side component 25 is completely eliminated, whereby the force acting on the expanding element 435 exceeds the force acting on the component 21, 25 for providing the force-locking connection. Otherwise, the function of this output device corresponds to the basic function described with reference to FIGS. 2 and 3.

Figure 9:
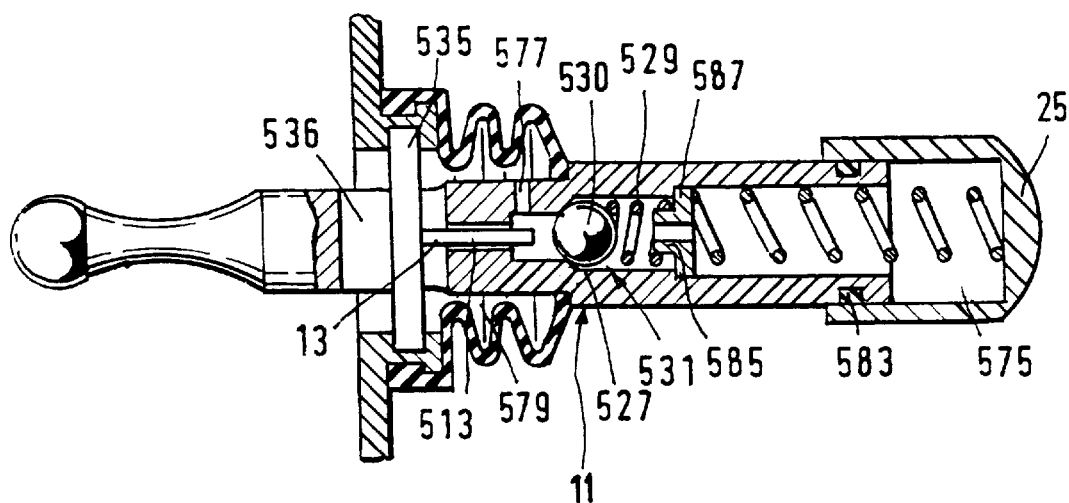
FIG. 9 shows another embodiment of the output device of FIG. 2 comprising a fluid chamber and a non-return valve.

In FIG. 9, the embodiment of the output device 7 has a fluid chamber 575. This fluid chamber 575 is equipped with a hydraulic connection 577 to a compensation space 579. The hydraulic connection 577 is controlled by an associated valve 527. In the example shown, valve 527 is a non-return valve 531 comprising a reset spring 529 that acts upon a ball 530 for the purpose of closing the hydraulic connection 577. Arranged on the side opposite to the reset spring 529 is a control element 13. The non-return valve 531 is opened against the active force of the reset spring 529 by control element 13. A rod 513 mounted in an axially movable fashion in the drive-side component 21 is provided as the control element 13. This rod 513 has associated with it a stop element 535, which penetrates the drive-side component 21 through an elongated slot embodied therein. The rod 513 rests in a position-dependent fashion against the stop 535. The position of valve 527 against the force of the reset spring 529 depends on the relative position of the drive-side component 21 to the stop element 535. The side of reset spring 529 that faces away from ball 530 in turn rests against a projection 585 in the drive-side component 21. The projection 585 is realized here by installation of a washer 587. The hydraulic chamber continues on the side of the washer 587 facing away from the drive-side component 21, and the energy storage device 15 here rests via the washer 587 on the drive-side component 21, which rests with its opposite end against the output-side component 25. The energy storage device 15 is located in the fluid chamber 575. However, a separate arrangement is also easily possible (see FIG. 10). In the region of overlap of the drive-side component 21 and the output-side component 25, a seal 583 is provided, to prevent the escape of the hydraulic medium at the connection point of the drive-side component 21 and the output-side component 25.

The function of the FIG. 9 embodiment is described as follows: When the fixing device 11 is active, the valve 527 is closed. The axial extension of the output device 7 is predetermined by the limited compressibility of the hydraulic medium. To release the fixing device 11, the output-side component 25 is moved toward the drive 3. The rod 513, which is mounted in axially movable fashion on the drive-side component 21, acts as the control element 13. The rod 513 meets the stop element 535. The drive-side component 21 penetrates stop element 535 through a slot 536 embodied therein. Upon continued movement of the drive-side component 21, a relative movement of the rod 513 and the drive-side component 21 is initiated. The rod 513 contacts the ball 530, and urges the ball 530 against the spring force of the reset spring 529 thereby opening the hydraulic connection 577. When the hydraulic connection 577 is released, the fluid medium in fluid chamber 575 escapes into the associated compensation space 579. If readjustment is provided largely in the form of shortening in the direction of the drive device 7, then providing the compensation space 579 for accommodation of the fluid medium will suffice. In this case, a fluid medium with high viscosity must be used, so that when the valve 527 is opened, the entire fluid medium does not escape from the fluid chamber 575. The fluid medium pressed into the compensation space 579 remains in the region of the hydraulic connection 577, so that readjustment in the form of lengthening of the output device 7 is possible to a limited extent. For example, if excessive readjustment in the shortening direction has occurred during a clutch procedure, this erroneous readjustment is corrected during the next clutch process.

It is also possible to provide a compensation space 579 filled with fluid medium as the compensation space 579. The lengthening of the output device 7 brought about by the energy storage device 15 due to pressure equilibrium again establishes the desired hydraulic pressure in the fluid chamber 575. However, the compensation space 579 must be so large that its hydraulic pressure changes insignificantly over the readjustment region.

Figure 10:
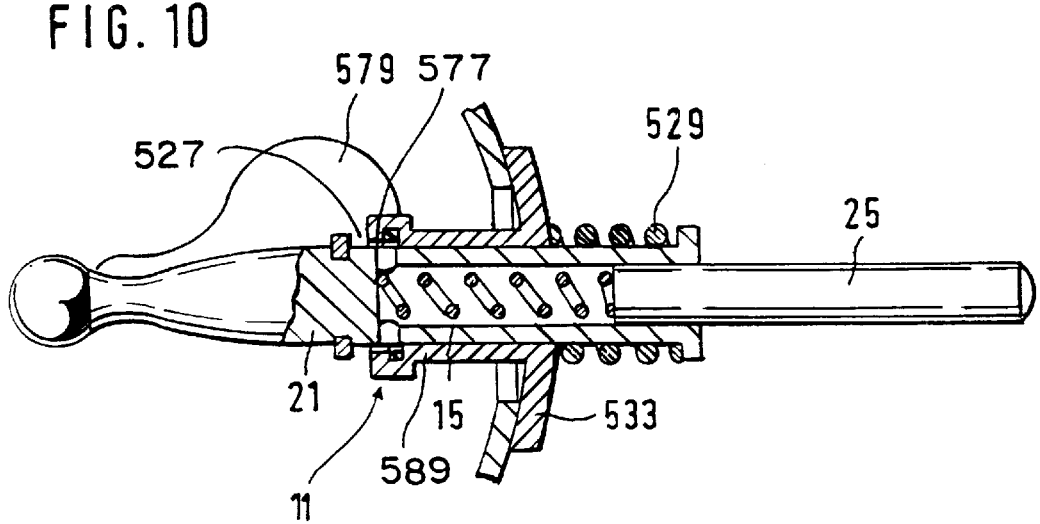
FIG. 10 shows another embodiment of the output device of FIG. 2 with a fluid chamber and a compensation space filled with fluid medium.

The output device 7 shown in FIG. 10 corresponds substantially to the output device described in reference to FIG. 9. A sleeve 589, which coaxially surrounds the drive-side component 21, is provided as the control element 13. This sleeve 589 is embodied with projections 533, which come into contact with stationary drive-side stops 535 for the purpose of opening the valve 527. Due to the resulting relative movement between the sleeve 589 and the drive-side component 21, the hydraulic connection 577 formed in the drive-side component to the compensation space 579 is released. Upon the onset of movement toward the output-side component 25, the valve 527 closes again and the fixing device 11 is active again.

Figure 11:
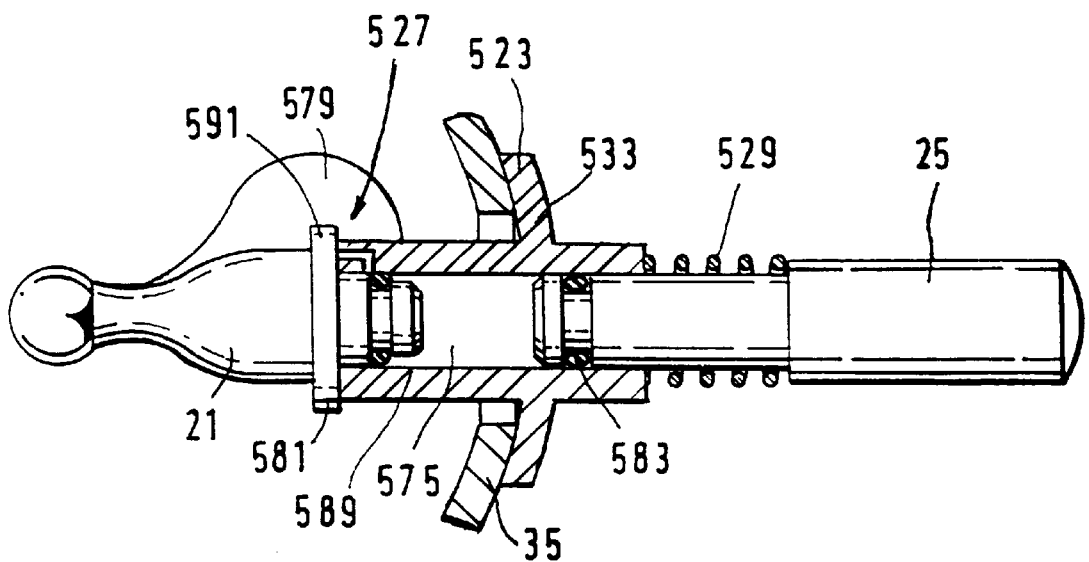
FIG. 11 shows yet another embodiment of the output device of FIG. 2 with fluid medium.

The embodiment shown in FIG. 11 differs from that shown in FIG. 10 essentially in the design of the valve 527. In this embodiment, the sleeve 589 is the intermediate component 523, while the valve 527 is controlled by the relative movement of the drive-side component 21 and the intermediate component 523. To close the valve 527, the drive-side component 21 has a closing element in the form of a radial projection 591. In this example, the drive-side 21 component and output-side component 25 are connected not directly, but rather via the intermediate component 523. The function corresponds essentially to that already described.

Figure 12:
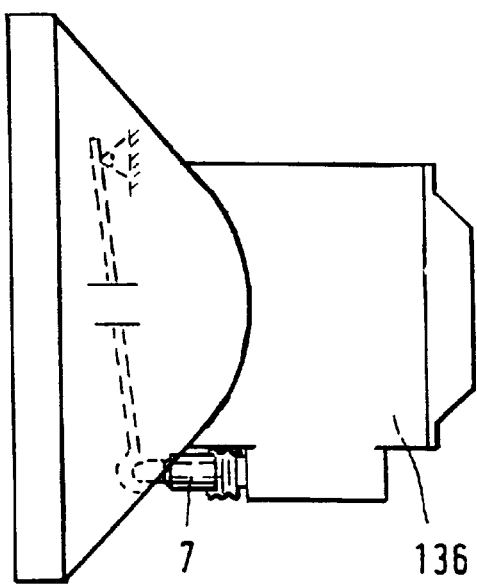
FIG. 12 shows an adjustment element integrated into a clutch housing with the output device according to the present invention.

FIG. 12 shows an adjustment element integrated into a clutch housing with the output device according to the present invention.

The invention is not limited by the embodiments described above which are presented as examples only but can be modified in various ways within the scope of protection defined by the appended patent claims.

We claim:

1. An adjusting device for actuating an operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fixing device operatively mounted between said first and second members comprising a wedge having a wedge surface connected to one of said first and second members, a mating surface on one of the other of said first and second members, and a cylindrical roller having a longitudinal axis arranged perpendicular to said axial direction and mounted between said wedge surface and said mating surface, said wedge surface urging said cylindrical roller toward said surface of the other of said first and second members for creating a force-locked connection between said first member and said second member;

a control device operatively connected to said fixing device for selectively releasing said force-locked connection at a predetermined operating state, thereby permitting said second member to move to a new position relative to said first member and said control device operatively connected to said fixing device for reconnecting said second member to said first member at said new position to compensate for a wear induced change in the operating position of the operating element to which said second member is abuttable; and a resilient member urging said second member toward said operating element relative to said first member so that said second member is movable toward said operating element by said resilient member relative to said first member when said control device releases said force-locked connection, wherein said resilient member is operatively mounted between said second member and said fixing device.

2. The adjusting device of claim 1, wherein said control device releases said force-locked connection against the urging of said resilient member.

3. The adjusting device of claim 2, wherein said control device comprises a shaft axially movably mounted in an elongated opening in said first member and an intermediate plate connected to and axially movable with said shaft, said intermediate plate abutting said cylindrical roller such that said resilient member urges said shaft toward said drive via said cylindrical roller.

4. The adjusting device of claim 3, wherein said control device is operatively arranged for contacting a stationary member when said first member is moved toward said first position, such that when said first member is in said first position, said shaft and said intermediate member are moved toward said second member for releasing said force-locked connection and permitting said resilient member to urge said second member toward said operating element to compensate for a wear induced change in the operating position of the operating element.

5. The adjusting device of claim 1, wherein said control device is operatively arranged for contacting the stationary member when said first member is moved toward said first position, such that when said first member is in said first position, said control device releases said force-locked connection and permits said resilient member to urge said second member toward said operating element to compensate for a wear induced change in the operating position of the operating element.

6. An adjusting device for actuating an operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fixing device operatively mounted between said first and second members comprising a wedge having a wedge surface connected to one of said first and second members, a mating surface on one of the other of said first and second members, and a cylindrical roller having a longitudinal axis arranged perpendicular to said axial direction and mounted between said wedge surface and said mating surface, said wedge surface urging said cylindrical roller toward said surface of the other of said first and second members for creating a force-locked connection between said first member and said second member;

a control device operatively connected to said fixing device for selectively releasing said force-locked connection at a predetermined operating state, thereby permitting said second member to move to a new position relative to said first member and said control device operatively connected to said fixing device for reconnecting said second member to said first member at said new position to compensate for a wear induced change in the operating position of the operating element to which said second member is abuttable, wherein said control device comprises a shaft axially movably mounted in an elongated opening in said first member and an intermediate plate having a first end connected to and axially movable with said shaft and a second end abutting said cylindrical roller.

7. The adjusting device of claim 6, wherein said control device is operatively arranged for contacting a stationary member when said first member is moved toward said first position, such that when said first member is in said first position, said shaft and said intermediate member are moved toward said second member for releasing said force-locked connection and permitting said resilient member to urge said second member toward said operating element, thereby permitting said second member to compensate for a wear induced change in the operating position of the operating element.

8. An adjusting device for actuating a operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fixing device operatively mounted between said first member and said second member for selectively connecting said first member to said second member, said fixing device comprising a lever having a latching profile articulately mounted on said first member and a mating profile on said second member, wherein said latching profile is urged toward said mating profile for creating a locked engagement between said first and second members;

a control device operatively connected to said fixing device for releasing said locked engagement at a predetermined operating state, thereby permitting a change in position of said first member relative to said second member to compensate for a wear induced change in the operating position of the operating element to which said second member is abuttable;

a resilient member urging said second member toward said operating element relative to said first member so that said second member moves toward said operating element relative to said first member when said control device releases said fixing device, said control device further comprising a surface on said lever operatively arranged for contacting a stationary member when said first member is moved toward said first position, such that when said first member is in said first position said latching profile is disengaged from said mating profile for releasing said fixing device and permitting said resilient member to urge said second member toward said operating element, thereby permitting said second member to compensate for a wear induced change in the operating position of the operating element, wherein said lever is resiliently mounted on said first member such that said latching profile normally engages said mating profile when no external forces act on said lever and said first member is normally connected to said second member.

9. An adjusting device for actuating an operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fixing device operatively mounted between said first member and said second member for selectively connecting said first member to said second member, said fixing device comprising a lever articulately mounted on one of said first and second members for selectively connecting with said other of said first and second members in a force-locked engagement;

a control device operatively connected to said fixing device for releasing said force-locked engagement at a predetermined operating state, thereby permitting a change in position of said first member relative to said second member to compensate for a wear induced change in the operating position of the operating element to which said second member is abuttable; and a first resilient member urging said second member toward said operating element relative to said first member so that said second member moves toward said operating element relative to said first member when said control device releases said fixing device, wherein said control device comprises an intermediate member having a control surface acting on said lever and a second resilient member operatively arranged between said intermediate member and said first member for urging said lever into the force-locked engagement with said second member.

10. An adjusting device for actuating a operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fixing device operatively mounted about said first member and said second member for selectively connecting said first member to said second member, said fixing device comprising a clamping spring element having a radially acting spring force acting on a radially outer one of said first and second members for creating a force-locked connection between said first member and said second member; and a control device operatively connected to said fixing device for releasing said radially acting spring force and said force locked connection at a predetermined operating state, thereby permitting a change in position of said first member relative to said second member to compensate for a wear induced change in the operating position of the operating element to which said second member is abuttable.

11. An adjusting device for actuating a operating element having an operating position that is subject to wear, the adjusting device comprising:

a first member connectable to a drive and movable by said drive between a first position and a second position;

a second member abuttable against the operating element and movably mounted on said first member for moving in an axial direction relative to said first member;

a fluid chamber enclosed by said first and second members and filled with a fluid medium, said fluid chamber being arranged parallel to said axial direction, and an expandable compensation space connected to said fluid chamber by a hydraulic connection;

a fixing device operatively mounted between said first member and said second member for selectively creating a fixed connection between said first member to said second member, said fixing device comprising a valve operatively connected between said fluid chamber and said hydraulic connection for selectively blocking said hydraulic connection and creating said fixed connection; and a control device operatively connected to said fixing device for releasing said valve and thereby releasing said fixed connection at a predetermined operating state, thereby permitting a change in position of said first member relative to said second member to compensate for a wear induced change in the operating position of the operating element to which said second member is abuttable, wherein said expandable compensation space is also filled with said fluid medium, and said change in position of said second member is realized by pressure compensation of the pressure supplied to said fluid chamber by the expandable compensation space.

* * * * *